United States Patent

Matsumoto et al.

[11] Patent Number: 6,130,604
[45] Date of Patent: Oct. 10, 2000

[54] ANTI-THEFT SYSTEM FOR VEHICLES

[75] Inventors: Satoru Matsumoto, Toyota; Kazuhiko Hayashi, Aichi-ken, both of Japan

[73] Assignee: Toyota Joshida Kabushiki Kaisha, Toyota, Japan

[21] Appl. No.: 09/177,892

[22] Filed: Oct. 23, 1998

Related U.S. Application Data

[63] Continuation of application No. PCT/JP97/00891, Mar. 19, 1997.

[30] Foreign Application Priority Data

Apr. 30, 1996 [JP] Japan .................................. 8-109708

[51] Int. Cl.[7] .................................................... B60R 25/10
[52] U.S. Cl. ................ 340/426; 340/825.3; 340/825.31; 340/825.32; 307/10.2; 307/10.5
[58] Field of Search ................................. 340/426, 425.5, 340/825.3, 825.31, 825.32; 307/10.2, 10.5, 10.3, 10.4; 180/287

[56] References Cited

U.S. PATENT DOCUMENTS

| | | | |
|---|---|---|---|
| 5,684,454 | 11/1997 | Nishioka et al. | 340/426 |
| 5,703,414 | 12/1997 | Mutoh et al. | 307/10.5 |
| 5,708,307 | 1/1998 | Iijima et al. | 307/10.5 |

FOREIGN PATENT DOCUMENTS

| | | |
|---|---|---|
| 55-6185 | 1/1980 | Japan . |
| 3-128747 | 5/1991 | Japan . |
| 3-072067 | 7/1991 | Japan . |
| 7-307983 | 11/1995 | Japan . |
| 8-080811 | 3/1996 | Japan . |

OTHER PUBLICATIONS

Automobile Technology Case Study, Issue No. 95603, Dec. 1, 1995, Japan Automobile Manufacturers Association, Intellectual Property Council.

*Primary Examiner*—Daryl Pope
*Attorney, Agent, or Firm*—Kenyon & Kenyon

[57] ABSTRACT

To prevent the engine from becoming able to be started by a cut-off of the communication line, for example, an engine control ECU 20 contains a reference code which is used to compare with a personal ID code transmitted from a transponder 12 of a key 10. A key insertion detecting switch 22 start this comparison when the insertion of the key is detected, and finishes the comparison before the engine is started. When a trouble of the key insertion detecting switch 22 is detected, a code collating section 20b collates the ID code with a reference code until the number of revolutions of the engine 30 exceeds 500 rpm. Therefore, even when the key insertion detecting switch 22 becomes out of order, it is possible to recognize the operation with a correct key, and give a permission to start the engine 30.

4 Claims, 4 Drawing Sheets

GENERAL CONFIGURATION

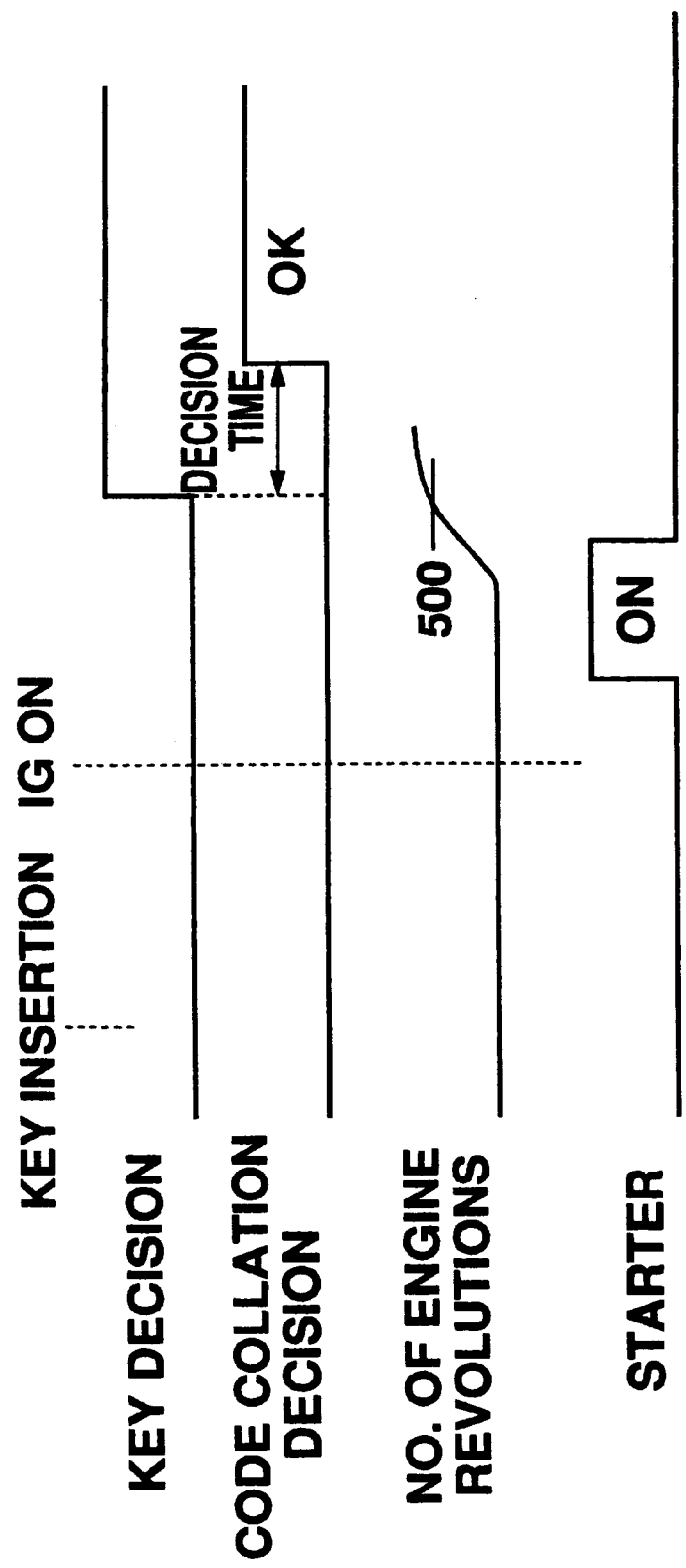

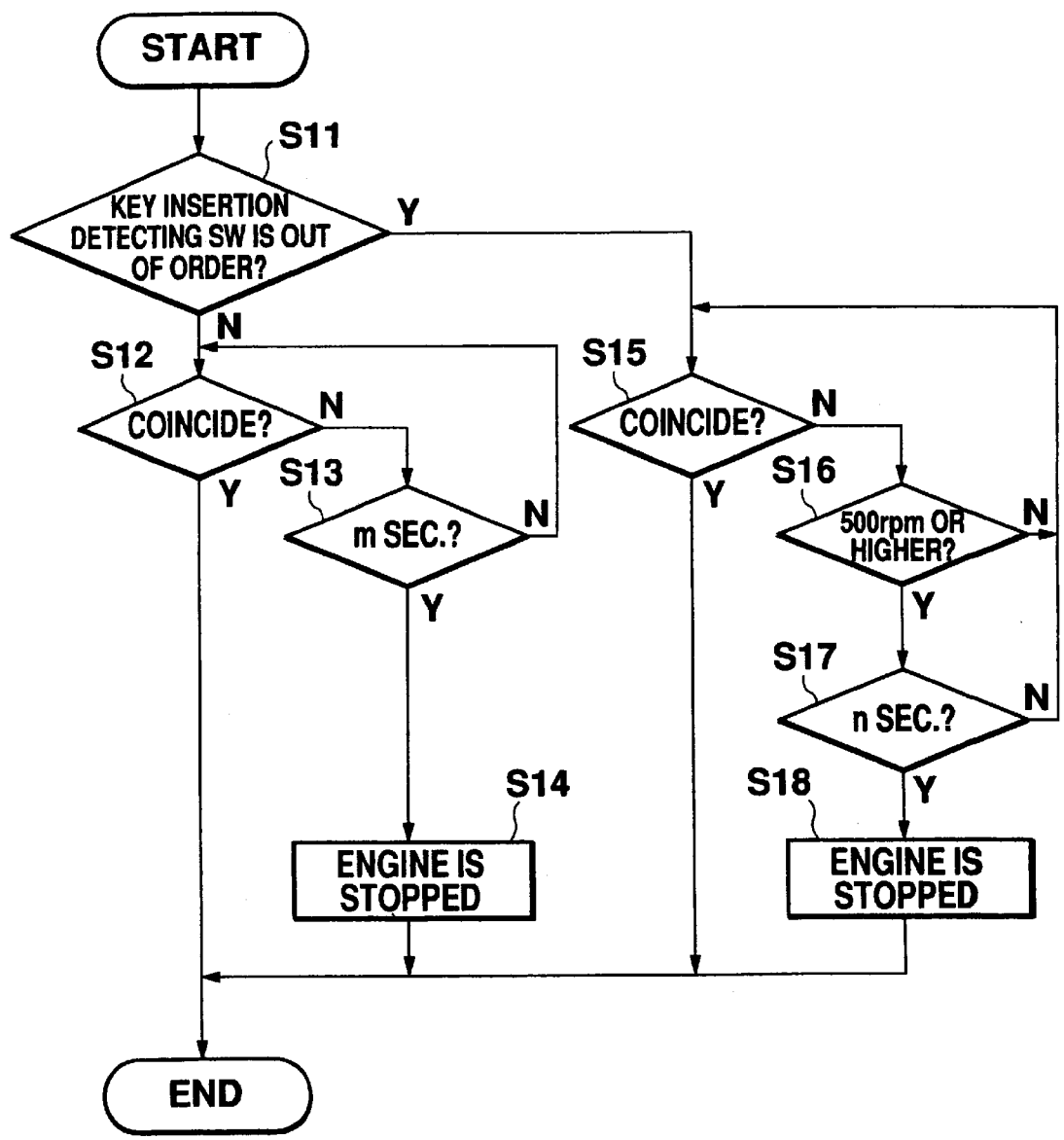

ANTI-THEFT SYSTEM FOR VEHICLES

This application is a continuation of PCT/JP97/00891 Mar. 19, 1997.

TECHNICAL FIELD

The present invention relates to an engine start control system, and more particularly to a system for halting the starting operation of the engine when an engine start operation is performed without the correct key.

BACKGROUND ART

Automobiles are normally equipped with door locks that should only be released with a correct key, and also with ignition locks so that the engine should only be started with a correct ignition key. These locking devices help protect automobiles against theft. To help ensure against theft, theft prevention mechanisms have been proposed and are in practical use.

An example of such a device can be found in "Automobile Technology Case Study"/issue No. 95603 (Japan Automobile Manufacturers Association, Intellectual Property Council: Dec. 1, 1995), where there is disclosed an anti-theft system for vehicles which is interlocked with an ignition key in such a way that the engine is prohibited from being started unless operated with a correct ignition key.

In this anti-theft system for vehicles, the ignition key has a built-in transponder for transmitting a personal identification (ID) code. This transponder receives power from electromagnetic radiation transmitted from the antenna provided on the key cylinder, and transmits an ID code. The antenna of the key cylinder is connected to the immobilizer ECU, and this immobilizer ECU decides whether the received ID code is correct or not. The immobilizer ECU is connected to the engine ECU for control of the ignition and fuel injection in the engine, and the immobilizer ECU notifies the engine ECU whether or not a correct ID code was received. If the immobilizer ECU did not receive the correct ID code, the engine ECU prohibits fuel injection and ignition in the engine, thereby halting the engine. Thus, if someone tries to start the engine without using a correct key, starting of the engine can be prevented so that the vehicle cannot run.

Note that in this case the engine ECU has already started the engine in the usual manner by ignition by manipulation of the ignition key, and that the device causes the engine to stop in response to a signal from the immobilizer ECU. In the early stage of the engine start operation there are great variations in the source voltage because the starter motor is rotating. For this reason, communication occurs between the immobilizer ECU and the engine ECU after the engine speed has increased to greater than 500 rpm.

Specifically, when the number of engine revolutions has exceeded 500 rpm, the engine ECU creates a predetermined rolling code A by random number generation, and sends the code to the immobilizer ECU. The immobilizer ECU, when it has recognized the correct key, generates a rolling code B by random number generation, and returns the rolling code B to the engine ECU. From the code B, the engine ECU confirms that the correct key has been used, and finishes the key confirmation process so that the ordinary engine operation is continued.

When a correct rolling code B is not returned within a predetermined period of time (a few seconds, for example), the engine ECU stops ignition and fuel injection. In other words, if the key inserted is not the correct key, the engine is stopped.

In a system as in the above mentioned example, when the immobilizer ECU decides that a theft has occurred as a result of code collation, the immobilizer ECU sets the communication line from the immobilizer ECU to the engine ECU to the L level. When detecting the L level of the communication line, the engine ECU stops the engine. Therefore, in this system, when a decision is made that this is a theft, the engine can be stopped at an early stage.

In the above system, when the communication line from the immobilizer ECU to the engine ECU is fixed at the H level, the engine does not stop for five seconds from the instant the number of engine revolutions reaches 500 rpm (for a period until it is confirmed that no rolling code has been returned). Consequently, the vehicle moves to some extent.

As the key insertion detecting switches are known which detect key insertion, the manipulation of the key can be detected at an early stage and it is therefore considered possible to finish key collation before the starter motor begins to rotate.

However, if the key insertion detecting switch is out of order, it is impossible to start the engine when this key insertion detecting switch is used to immediately collate the key as if the key insertion detecting switch is out of order, the immobilizer ECU does not start the collating action and a coincidence signal cannot be obtained. Because of this, the engine is stopped whenever the key is inserted.

In Japanese Patent Laid-Open Publication No. Hei 7-307983, it has been proposed to prolong the decision time according to a cranking state, but the problem in this case is that only time prolongation is done, so that it takes too long a time before a permission to start the engine is given.

The present invention has been made to solve the above problem, and has as its object to provide an anti-theft system for vehicles, which is capable of making an efficient decision about the adequacy of the key, even when the key insertion detecting switch is out of order.

DISCLOSURE OF INVENTION

According to the present invention, there is provided an anti-theft system for vehicles comprising key insertion detecting means for detecting the insertion of a key for turning on and off ignition; key adequacy decision means for deciding the adequacy of use of the key in response to the detection of the key insertion; engine operation permission means for controlling permission or prohibition of the engine operation according to a result of the key adequacy decision; trouble detecting means for detecting a trouble of the key insertion detecting means; and decision timing changing means for changing the timing of an adequacy decision about the use of the key so as to execute this adequacy decision at least after completion of the starter motor operation when the trouble is detected.

In the present invention, since key insertion detecting means is provided, a decision can be made about the adequacy of the key immediately after key insertion. Therefore, a key adequacy decision can normally be completed before the starter motor is engaged, and the engine can be prohibited from starting when an incorrect key is used. Accordingly, when an incorrect key is used, the vehicle is completely prohibited from running.

On the other hand, when the key insertion detecting means is defective, the decision about key adequacy is delayed until after the completion of the starter motor operation. Therefore, a key adequacy decision can be executed after the motor starter operation when the source voltage is stable rather than during the motor starter operation when the source voltage is unstable. Consequently, it is possible to reduce mistakes in recognition of adequate starting operation with a correct key.

According to another aspect of the invention, when a trouble has been detected in the key insertion detecting means, a key adequacy decision is made when a key is inserted or in a predetermined period from the instant of ignition; on the other hand, when a trouble of the key insertion detecting means has been detected, a key adequacy decision is made for a predetermined time period from when the engine speed reaches a predetermined number of revolutions.

When the engine speed exceeds a specified number of revolutions, a resulting stoppage of the starter motor is detected, and then, a key adequacy decision is executed. Therefore, even when the key insertion detecting switch is out of order, a reliable decision about the key adequacy can be performed. Moreover, even if a false signal to drive the starter motor is input, the engine can be securely halted.

According to yet another aspect of this invention, and anti-theft system for vehicles is characterized in that the above-mentioned predetermined time period is shortened each time the engine start operation fails.

Therefore, for example, even when a false signal to drive the starter motor rotation is input, the distance that the vehicle moves for a time period until the end of the key adequacy decision can be decreased.

Furthermore according to a still additional aspect of this invention, an anti-theft system for vehicles is characterized in that the predetermined time period when a trouble of the key insertion detecting means has been detected is longer than the predetermined time period when a trouble of the key insertion detecting means has been detected.

When the key insertion detecting means is out of order, by prolonging the time period for the key adequacy decision, a more reliable decision about key adequacy can be made.

BRIEF DESCRIPTION OF DRAWINGS

FIG. 3 is a timing chart showing the operation of an embodiment of the present invention when the key insertion detecting switch is out of order; and FIG. 4 is a flowchart showing the operation of an embodiment of the present invention.

BEST MODE FOR CARRYING OUT THE INVENTION

Figure 1:
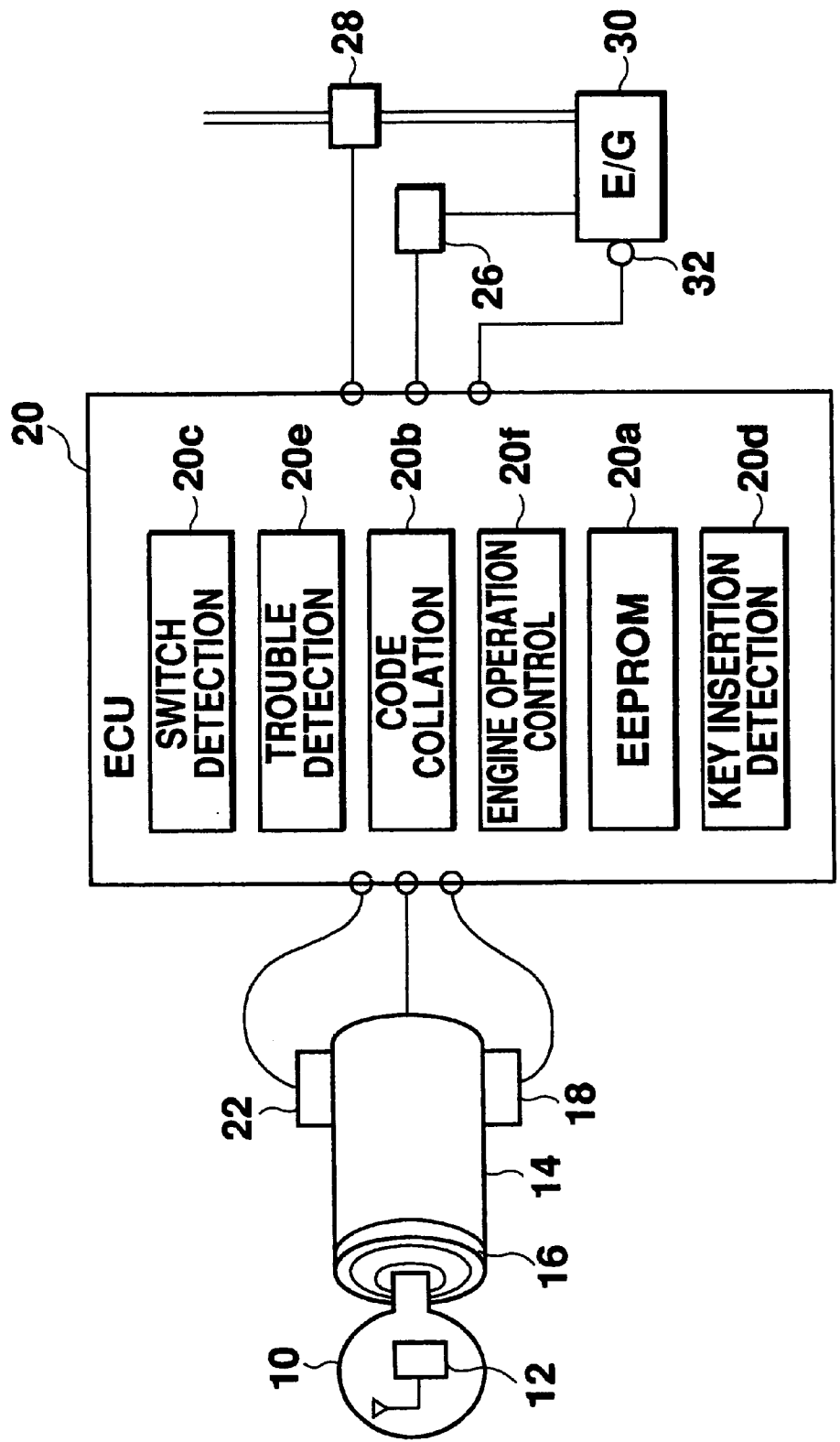
FIG. 1 is a block diagram of an entire system of an embodiment of this invention.

A best mode for carrying out the present invention will be described with reference to the accompanying drawings.
Whole System Configuration FIG. 1 is a diagram showing a complete system of an anti-theft system for vehicles according to a preferred embodiment of the invention. An ignition key 10, which is used also to open or close the door lock, has a transponder 12 mounted therein. The transponder 12 includes an antenna, a power source circuit, a memory, a reading circuit, and a transmitting circuit. The transponder 12, on receiving a predetermined signal from outside through its antenna, supplies a signal to the power source circuit. The power source circuit obtains electric power from the received wave, and supplies power to the other circuits. The power source circuit reads the ID No. from the memory, and transmits the ID No. from the antenna through its transmitter circuit.

A key cylinder 14 is rotatable by an ignition key 10 having a specified shape (or specified magnetization, for example), and, as is usual with key cylinders, key cylinder 14 is provided on its different rotating positions, various switches, such as an accessory switch, an ignition switch, and a starter switch. Specifically, the accessory switch is provided to turn on and off power to accessory equipment, the ignition switch is used to turn on and off power for devices necessary for driving, such as the ignition plugs, and the starter switch is used to turn on and off power for the starter motor. Only when the tip of the ignition key 10 fits into the key cylinder 14 can the key rotate.

An antenna 16 is attached to the periphery of the front face side (the side into which the key 10 is inserted) of the key cylinder 14. A specified electric wave is transmitted from the antenna 16 to the transponder 12, and an electric wave from the transponder 12 is received by this antenna 16.

An engine control ECU 20 is connected to this antenna 16 through the intermediary of an amplifier 18 which amplifies the received signal. A key insertion detecting switch 22 provided on the key cylinder 14 outputs a signal about whether the key 10 is inserted or not to an engine control ECU 20. Therefore, the moment the key 10 is inserted, the engine control ECU 20 can detect the key insertion, and at this moment the engine ECU 20 can transmit a specified electric wave from the antenna, and receive a response signal from the transponder 12.

The engine ECU 20 stores a reference code corresponding to the ID code in the key 10. In this embodiment, a reference code is stored in EEPROM 20a. A code collating section 20b decides if the ID code sent from the transponder 12 through the antenna 16 coincides with the reference code.

The engine ECU 20 receives switch on-off information from the key cylinder 14, and a switch detecting section 20c detects the states of switch operations in the key cylinder 14. More specifically, the switch detecting section 20c monitors the on/off states of the accessory switch, the ignition switch, and the starter switch. The key insertion detecting switch 22 on the key cylinder 14 detects whether or not the key 10 is inserted in the key cylinder 14. This key insertion detecting switch 22 is usually formed of mechanical contacts, but various types, such as an optical detector, may be used. From the output of the key insertion detecting switch 22, a key insertion detecting section 20d detects the insertion of the key.

A trouble detecting section 20e detects a trouble of the key insertion detecting switch 22 from detection results of the key insertion detecting section 20d and the switch detecting section 20c. More specifically, the switches are normally turned on or off after the key has been inserted, and therefore a trouble of the key insertion detecting switch 22 is detected by spontaneous turning on or off of any of the switches despite the fact that key insertion is not detected, or by a check before driving the engine.

The engine control ECU 20 includes an operation control section 20f which controls an ignition (plug ignition) control section 26, and a fuel injection control section 28. The ignition control section 26 and the fuel injection control section 28, connected to the engine 30, control the ignition and fuel injection of the engine 30.

In other words, the operation control section 20f of the engine control ECU 20 detects ignition by turning of the key cylinder 14 from a signal from the switch detecting section 20c, and according to this signal, performs control to make it possible to supply power to the ignition plugs and to inject fuel to the engine. In accordance with the rotation of the engine 30 set in motion by the starter motor, the operation control section 20f speeds up ignition and fuel injection, and as the engine 30 accelerates, the operation control section 20c continues to control ignition and fuel injection.

A rotation sensor 32 for detecting the number of revolutions, which is connected to the engine control ECU 20, detects the number of revolutions of the engine 30. Other components of the engine control ECU 20 are transmit/receive circuits for communication via the antenna 16.

Operation

Figure 2:
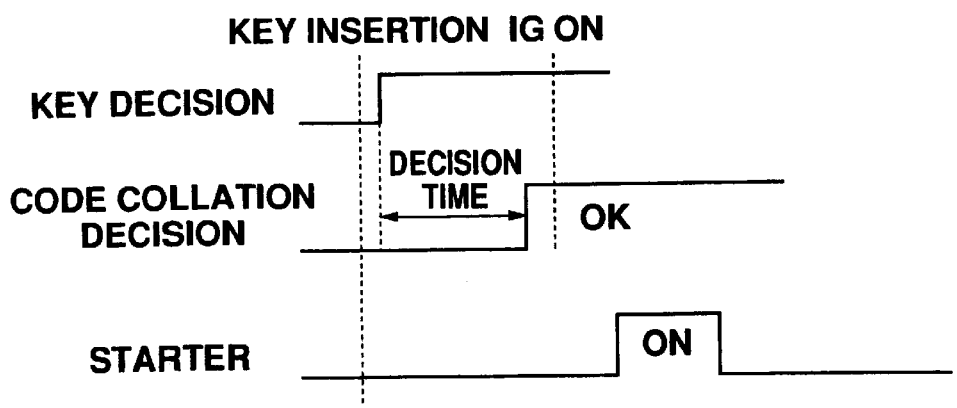
FIG. 2 is a timing chart showing the operation of an embodiment of the present invention when the key insertion detecting switch is normal.

The operation of this system will then be described with reference to the timing charts in FIGS. 2 and 3, and the flowchart in FIG. 4.

When the power source for the engine control ECU 20 has become stable, the trouble detecting section 20e detects whether the key insertion detecting switch 22 is out of order or not (S11). If the switch 22 is not out of order, the engine control ECU 20 is put into operation when the driver inserts the ignition key 10 into the slot of the key cylinder 14.

The engine control ECU 20 transmits a specified signal to the antenna 16, and receives a signal from the transponder 12. A decision is made if the ID code of the received signal coincides with the reference code stored in EEPROM 20a (S12). If the two codes do not coincide, a decision is made if m sec. have passed (S13). If m sec. have not passed, the process goes back to S12.

When the two codes coincide in less than m sec., the starting operation is judged as normal, and a permission is given to proceed to the subsequent operation. Specifically, in response to turning on of the ignition switch by the manipulation of the key 10, the engine control ECU 20 controls the ignition control section 26 and the fuel injection section 28 to make the engine 30 ready to operate. By turning on the starter switch, the starter motor comes into operation, the engine 30 begins to rotate, ignition and fuel injection begin to take place.

On the other hand, at S13, if the codes do not coincide and m sec. have passed, the starting operation of the engine is stopped (S14). By control as described, the ignition and fuel injection are prohibited and the engine is prohibited from starting. As shown in FIG. 2, m sec. should be set as a time period longer than a time period necessary for a routine decision. It is preferred to shorten m sec. from 3 sec. to 2 sec. and to 1 sec. step by step each time the engine starting operation fails (engine stop).

At S11, if the key insertion detecting switch 22 is out of order, the engine control ECU 20 begins to operate by turning on of the ignition switch, or the like. Accordingly, the engine control ECU 20, in the same way as has been described, receives the ID code from the transponder 12, and decides if the ID code coincides with the reference code (S15). When the two codes coincide, the starting operation is judged as normal and permission to proceed to the subsequent operation is given.

At S15, if the two codes do not coincide, a decision is made if the number of revolutions of the engine 30 has reached 500 rpm (S16), and if not, the process goes back to S15 to repeat a coincidence decision until 500 rpm is reached. When the number of revolutions of the engine 30 exceeds 500 rpm, a decision is made to see if n sec. have elapsed (S17). If n sec. have not passed, the process goes back to S15 to perform a coincidence decision. Therefore, a coincidence decision is performed from when the number of revolutions of the engine 30 has reached 500 rpm until n sec. elapse.

At S17, when n sec. have passed, like in S14, the starting operation of the engine is stopped (S18). It is preferable to successively shorten the n sec. mentioned above from 6 sec. to 4 sec. to 2 sec. each time the engine starting operation fails (engine stop).

As has been described, when the key insertion detecting switch 22 is out of order, by prolonging the time period for code collation (key decision), a sufficient time period can be secured for key decision.

Industrial Applicability

As is obvious from the foregoing description, according to the present invention, according to a signal from the key insertion detecting switch, the ID code reception from the key and the code collation process are performed the moment the key is inserted. Therefore, the code can be collated before the starter motor rotates, so that when the starting operation with an incorrect key occurs, the starting operation of the engine can be stopped before the engine rotates. Accordingly, in this case, the vehicle can be completely prohibited from running.

In case the key insertion detecting switch is out of order, after the engine speed has reached 500 rpm, the code collation is performed until a predetermined time period elapses. Therefore, the code collation can be done securely, and a key adequacy decision can be made even when the key insertion detecting switch is out of order.

What is claimed is:

1. An anti-theft system for vehicles, comprising:

key insertion detecting means for detecting the insertion of an ignition key;

key adequacy decision means for deciding the adequacy of use of the key which starts to operate in response to the detection of key insertion;

engine operation permission control means for controlling the permission or prohibition of the engine operation according to a result of the key adequacy decision;

trouble detecting means for detecting trouble in the key insertion detecting means; and decision timing changing means for changing the timing of an adequacy decision about the use of the key so as to execute said adequacy decision after completion of the starter motor operation when trouble is detected, thereby terminating the operation of the engine based on the key adequacy decision.

2. The anti-theft system for vehicle according to claim 1, wherein:

when trouble has not been detected in the key insertion detecting means, a key adequacy decision is made when the key is inserted or in a specified time period from the instant of ignition, and when trouble of the key insertion detecting means is detected, a key adequacy decision is made for a specified time period from when the number of engine revolutions has reached a specified number.

3. The anti-theft system for vehicles, according to claim 2, wherein said specified time period is successively shortened each time the engine starting operation fails.

4. The anti-theft system for vehicles, according to claim 2, wherein said specified time period when a trouble of the key insertion detecting means has not been detected is longer than said specified period when a trouble of the key insertion detecting means is detected.

* * * * *